9633X
E. Smith,
Making Laths.
Patented Apr. 28, 1836.
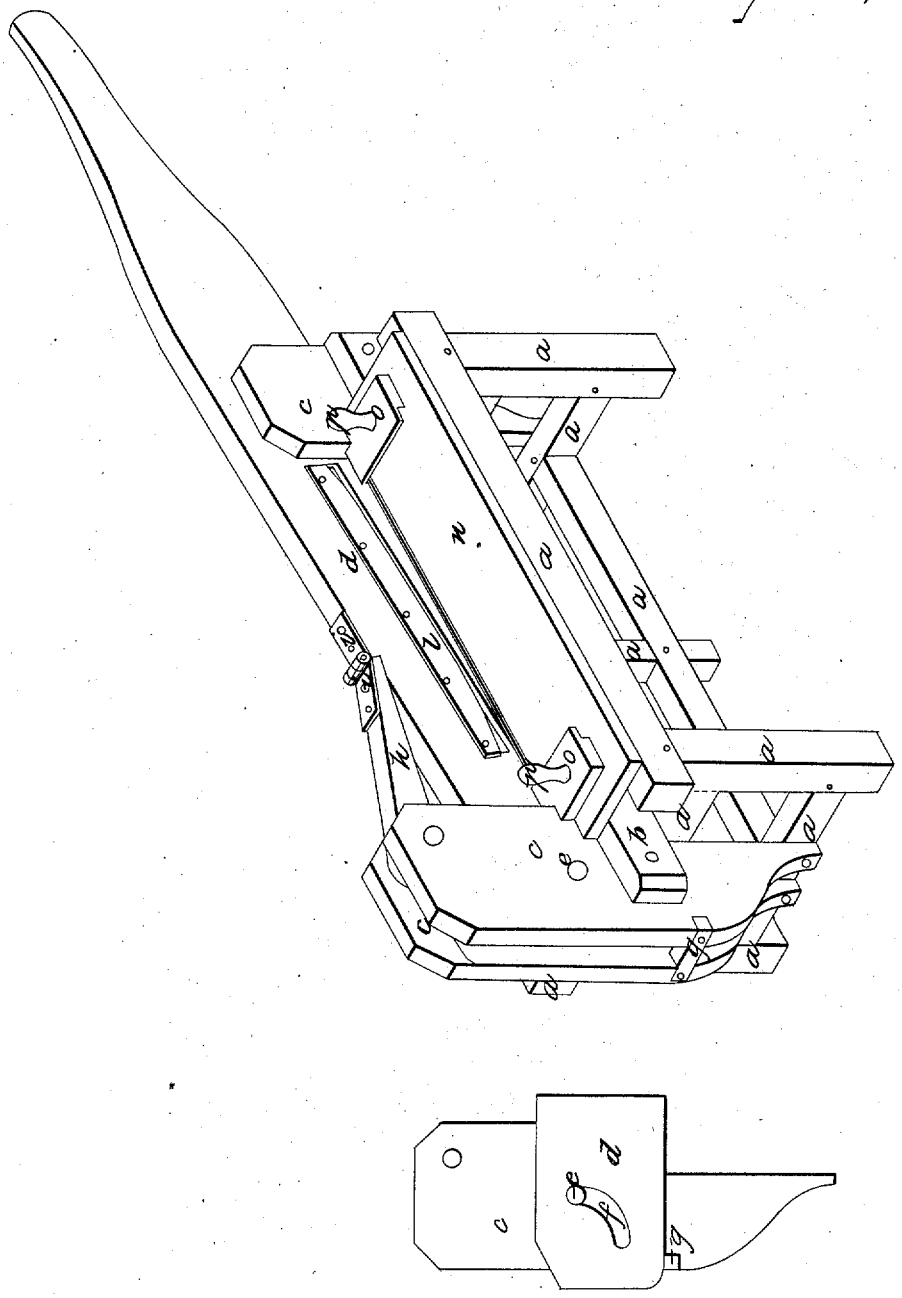
AM. PHOTO-LITHO. CO. N.Y. (OSBORNE'S PROCESS)

9633X Elihu Smith, of Ithaca, N. York

Letters Patent

The schedule referred to in these Letters Patent and making part of the
same, containing a description in the words of the said Elihu Smith, of his im-
provement in the machine for cutting & making Laths –

---

To all to whom these presents shall come: Be it known that I Elihu Smith
of the Village of Ithaca, now of Troy, in the County of Tompkins and State of
New York, have invented a new and useful machine to cut and make
laths, and that the following is a full and exact description thereof viz.
There is a frame about 2 ft. 6 inches wide and five feet six inches long made
in the form of a common joiners work bench. 2 feet 6 inches high made of
common square timber four by five inches, the side pieces on the top of the
posts, or legs, four feet 6 inches long, through the centre of the frame or bench,
there is two sticks of timber or beams, 5 by 6 inches, to be 6 feet 6 inches long, to
lay on the cross or end timbers that is framed into the posts, so as to be level
with the side pieces on the top; on each end of these sticks or beams are up-
right planks, two inches thick & may be 12 or 18 inches wide & to come up about
two feet above the top of the bench or frame, to let the whole thickness into the
beams, and made fast with screws or bolts, these two last mentioned sticks or
beams are placed 3 or 4 inches apart, whatever may be the thickness of the
lever. The lever is made of a plank 3 or 4 inches thick & 12 or 15 inches wide,
and from 8 to 12 feet long, the lever is placed between the upright plank on
a rolling pivot, that is put through the plank & lever, and in the lever there is
a quarter circle cut for the lever to play in, as it works up & down between
the beams, on the back edge of the planks on the top of the beams, there is a two
inch square piece bolted fast to the edge of the planks, for the back end of
the lever to rest upon which serves to through the lever forward as it is rais-
ed up, on the top of the lever there is a brace or reach hung with an iron
hinge fast on the top of the lever, and the uper end of the reach is hung
on a rolling pivot between the upright planks, which serves to draw the lever
or shears back, when it is raised up and down. On the side near the bottom 206. 9633X is a long knife 4ft. 42 in. may be made three or four inches wide and with a thick & the edge made thin & on a circle of one & 1/2 inches made fast to the shears or lever with screws or bolts. On the beam under the knife is placed a piece of common band iron, to be just thick enough to fill the space between the knife & the lever which is about the thickness of the lath & to come up even with the top of the bench. There is a board placed between the beam & the outside of the bench to form a plat form to lay the board or stuff on that is to be cut into lath, on this platform at each end of the knife, there, is placed a cleat with a hand screw in the same, for the purpose of holding the stuff while it is being cut into lath — . —

What I claim as my own invention, and not previously known, in the above described machine is a piece of Timber or plank 3 by 12 or 15 inches & about 8 or 12 feet long as before specified to be hung at one end on a rolling pivot, having a quarter circle opening through it & upon the top of this is placed a reach or brace that works a pivot or hinge & at the back end there is placed under the shears a square piece & the edge of the knife being made on a circle, and that the stuff on the before mentioned band iron when it is cut; and that the operation is done by the raising & falling of the long end of the shears, this may be done by hand or any other power.

Elihu Smith

Witnesses
Augustus Sherrill
Jesse [illegible]

[illegible]

Ent.
1196

Patented April 28. 1836

Drawings